US012771101B2

(12) United States Patent
Burke

(10) Patent No.: US 12,771,101 B2
(45) Date of Patent: Oct. 20, 2026

(54) POLYMER UTILITY VAULT AND METHOD OF MANUFACTURING BY WELDING

(71) Applicant: CHANNELL COMMERCIAL CORPORATION, Temecula, CA (US)

(72) Inventor: Edward J. Burke, Temecula, CA (US)

(73) Assignee: Channell Commercial Corporation, Rockwall, TX (US)

( * ) Notice: Subject to any disclaimer, the term of this patent is extended or adjusted under 35 U.S.C. 154(b) by 0 days.

(21) Appl. No.: 18/734,852

(22) Filed: Jun. 5, 2024

(65) Prior Publication Data

US 2025/0379427 A1 Dec. 11, 2025

(51) Int. Cl.

| | |
|---|---|
| ***H02B 7/08*** | (2006.01) |
| ***B29C 65/08*** | (2006.01) |
| ***B29C 65/20*** | (2006.01) |
| ***B29L 31/00*** | (2006.01) |
| ***H02B 1/46*** | (2006.01) |

(52) U.S. Cl.

CPC ................. *H02B 7/08* (2013.01); *H02B 1/46* (2013.01); *B29C 65/08* (2013.01); *B29C 65/20* (2013.01); *B29L 2031/7162* (2013.01)

(58) Field of Classification Search

CPC .. H02B 7/08; H02B 1/46; B29C 65/08; B29C 65/20; B29L 2031/7162

See application file for complete search history.

(56) References Cited

U.S. PATENT DOCUMENTS

| | | | | |
|---|---|---|---|---|
| 3,499,808 A * | 3/1970 | Obeda | B29C 66/21 156/580.2 |
| 7,385,137 B2 | 6/2008 | Burke et al. | |
| 2014/0117018 A1* | 5/2014 | Burke | H02G 9/10 220/484 |
| 2024/0266817 A1* | 8/2024 | Noordyk | H02G 9/10 |

FOREIGN PATENT DOCUMENTS

| | | |
|---|---|---|
| CN | 203270612 U | 11/2013 |
| CN | 110126294 A | 8/2019 |
| JP | 2004122616 A * | 4/2004 |

OTHER PUBLICATIONS

Vendan et al., "Confluence of Multidisciplinary Sciences for Polymer Joining", Springer Nature Singapore Pte Ltd, 2019, pp. 17-22. (Year: 2019).*

Troughton, "Handbook of Plastics Joining: A Practical Guide", Chapter 1—"Heated Tool Welding", pp. 3-13, 2009. (Year: 2009).*

(Continued)

*Primary Examiner* — Christopher W Raimund

(74) *Attorney, Agent, or Firm* — Womble Bond Dickinson (US) LLP

(57) ABSTRACT

A utilities enclosure comprising a grade level vault adapted for installation below ground and having an upper opening facing an interior region for containing at least a below-ground utility service, the grade level vault is formed in two halves comprising a first half and a second half, wherein each of the first half and the second half have an edge wall on opposite spaced apart end walls, each edge wall having a sacrificial pad extending outwardly therefrom which when (Continued)

heated and pressed together under pressure with a sacrificial pad on an opposite edge wall welds the first half and the second half together to form a seam.

7 Claims, 7 Drawing Sheets

(56) References Cited

OTHER PUBLICATIONS

Anonymous: "Hot plate welding", Wikipedia, Dec. 18, 2022 (Dec. 18, 2022), pp. 1-9, XP093101392, Retrieved from the Internet: URL:https://en.wikipedia.org/w/index.php?title=Hotj3late_welding &oldid=1128040327 [retrieved on Nov. 14, 2023].
"Heated Tool Welding of Thermoplastic Mouldings in Series Production", Welding in the World, Springer, DE, vol. 30, No. 11 / 12, Nov. 1, 1992 (Nov. 1, 1992), pp. 319-328, XP000320924,ISSN: 0043-2288.
European Search Report for European Patent Application No. 25180879.6, dated Nov. 5, 2025, 16 pages.
Corrected European Search Report for European Patent Application No. 25180879.6, dated Nov. 12, 2025, 14 pages.

* cited by examiner

POLYMER UTILITY VAULT AND METHOD OF MANUFACTURING BY WELDING

FIELD OF THE INVENTION

This invention relates to enclosures for buried and underground electrical transmission lines and related electrical devices and contacts. The invention includes a grade level box or vault and a method of manufacturing the vault by joining two halves of the vault together by welding.

BACKGROUND OF THE INVENTION

Various electrical transmission lines and other equipment used for buried and underground utilities are commonly contained in enclosures that protect the underground wiring cables, fiber taps and splices, service lines, etc. from the environment. Initial construction often requires installation of such a below-ground enclosure, commonly referred to as a grade level box or vault. Later, if service is to be provided to the premises, the cover for the grade level box is removed and connections are made inside an above-ground pedestal housing mounted on the grade level box. The above-ground connections are protected from the weather but also must be protected from vandalism and tampering.

The present invention is applicable to any enclosure system or vault for storing and protecting underground or buried electrical conductors and devices from the environment and for facilitating access to them when making further connections, providing service, making new installations, and the like. The invention is applicable to electrical utilities connections normally using buried or underground lines or connections such as cable TV, data transmission lines, various types of telecommunications, optical fiber connections, commonly referred to as “fiber to the premises”, service lines, water meters, electrical power distribution, and other utilities equipment, for example.

Typically, underground utility vaults or enclosures consist of two molded halves which together form the enclosure. The two halves were joined by mechanical fasteners including nuts and bolts and perhaps rivets. After mechanically joined, the joint was then sealed with some sort of sealant. These methods of joining the halves together were time consuming, labor intensive and required an inventory of fasteners and sealants, not to mention required the use of additional tools for assembly. Consequently, a need exists for an improved enclosure or vault and a method of joining the two halves together that eliminates the drawbacks of previous enclosures and methods of assembly.

SUMMARY OF THE INVENTION

The present invention provides an improved enclosure system that simplifies assembly by eliminating mechanical fasteners by employing a hot plate welding process to join the two halves of the vault together. The invention, when compared with prior enclosure systems, reduces the parts required for assembly and reduces time and labor costs for production.

One embodiment of the invention comprises an underground utilities enclosure which includes a grade level box adapted for installation below ground and having an upper opening facing an interior region for containing a below-ground electrical utility connections and is utilized in the power, utility, telecommunications, and broadband markets. The vault has an integral chamber passageway for controlling and organizing customer service connections. Each of the two halves of the vault to be joined are molded with sacrificial pads that when heated, melt and fuse together. The sacrificial pads are designed with adequate size to create a continuous bond along the seam to maintain the halves together and seal the interior of the vault. The area to be welded includes channels and ribs to minimize welded material from extruding past the perimeter of the vault.

The vault halves are placed in a specialized apparatus and held in place by fixtures where heat from a plate is applied to the sacrificial pad at a prescribed temperature for a specific time. The hot plate is then removed and the two surfaces to be joined are forced together under a predetermined pressure for a specified time to complete the joint.

The welded halves have a connection strength that is equal to or better than mechanical fasteners previously used to join the halves together. Alternatively ultrasonic welding, vibration welding or robotically controlled plastic welding could be used to weld the seams for similar results.

As part of the assembly process racks and other vault accessories, which prior to the invention were bolted into the side walls of the vault or enclosure, are welded in place. The vault halves are molded with a corresponding molded boss or post to match with a hole in the rack or accessory. The bosses or posts protrude through the rack or accessory to the vault or enclosure and the end of the boss or post is upset by ultrasonic welding to lock the rack or accessory in place. Alternatively heat from the hot plate can be applied to the end of the boss or post to upset the material and lock the rack or accessory in place. This can be done with a prescribed temperature and pressure to form the required material upset.

These and other aspects of the invention will be more fully understood by referring to the following detailed description and the accompanying drawings.

DETAILED DESCRIPTION

Figure 1:
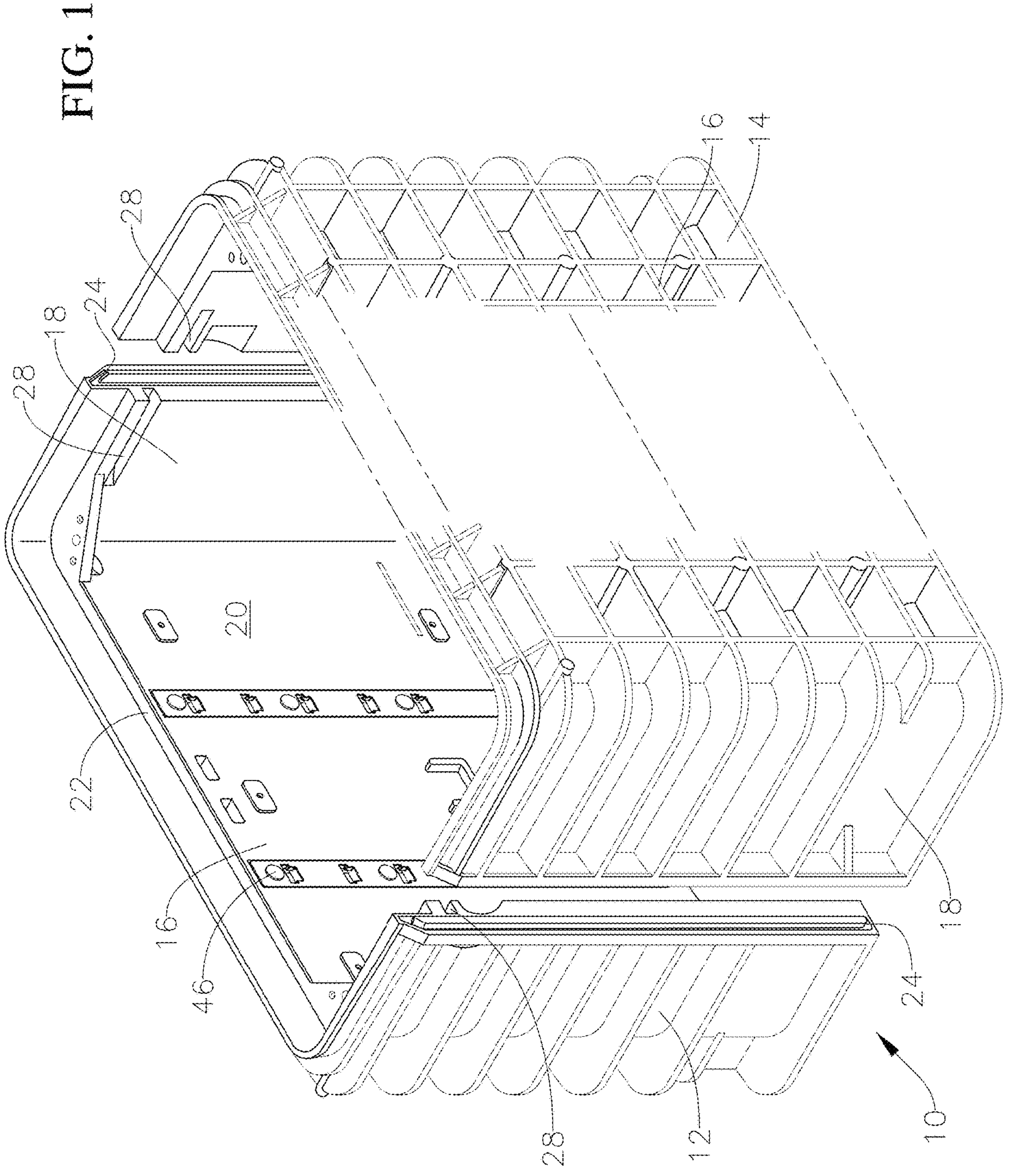
FIG. 1 is a perspective exploded view of one embodiment of an underground electrical utilities enclosure according to principles of this invention.

FIG. 1 illustrates one embodiment of an underground vault 10 according to principles of this invention. The underground vault also is referred to as a grade level box. The box is preferably made of a polymer, typically a hard plastic from a plastic molding process in two halves 12, 14. The grade level box is generally rectangular in configuration, having elongated parallel side walls 16 and shorter parallel end walls 18. The side and end walls enclose a hollow interior region 20 within the box. The grade level box has an open bottom and an open top. In use, the grade level box is placed below ground level to contain underground electrical connections such as utility cables or conduits, data transmission lines, service lines, optical fiber cables and other underground utility devices, lines, or cables. These are referred to generally herein as electrical utility connections.

The electrical connections go into the hollow interior of the grade level box through the bottom opening of the box. In use, the box is placed in the ground, so its top is generally parallel with the ground level. The grade level box has a rim 22 spaced below the top opening 18 and the rim extends around the inside walls of the box to support a cover plate.

Figure 2:
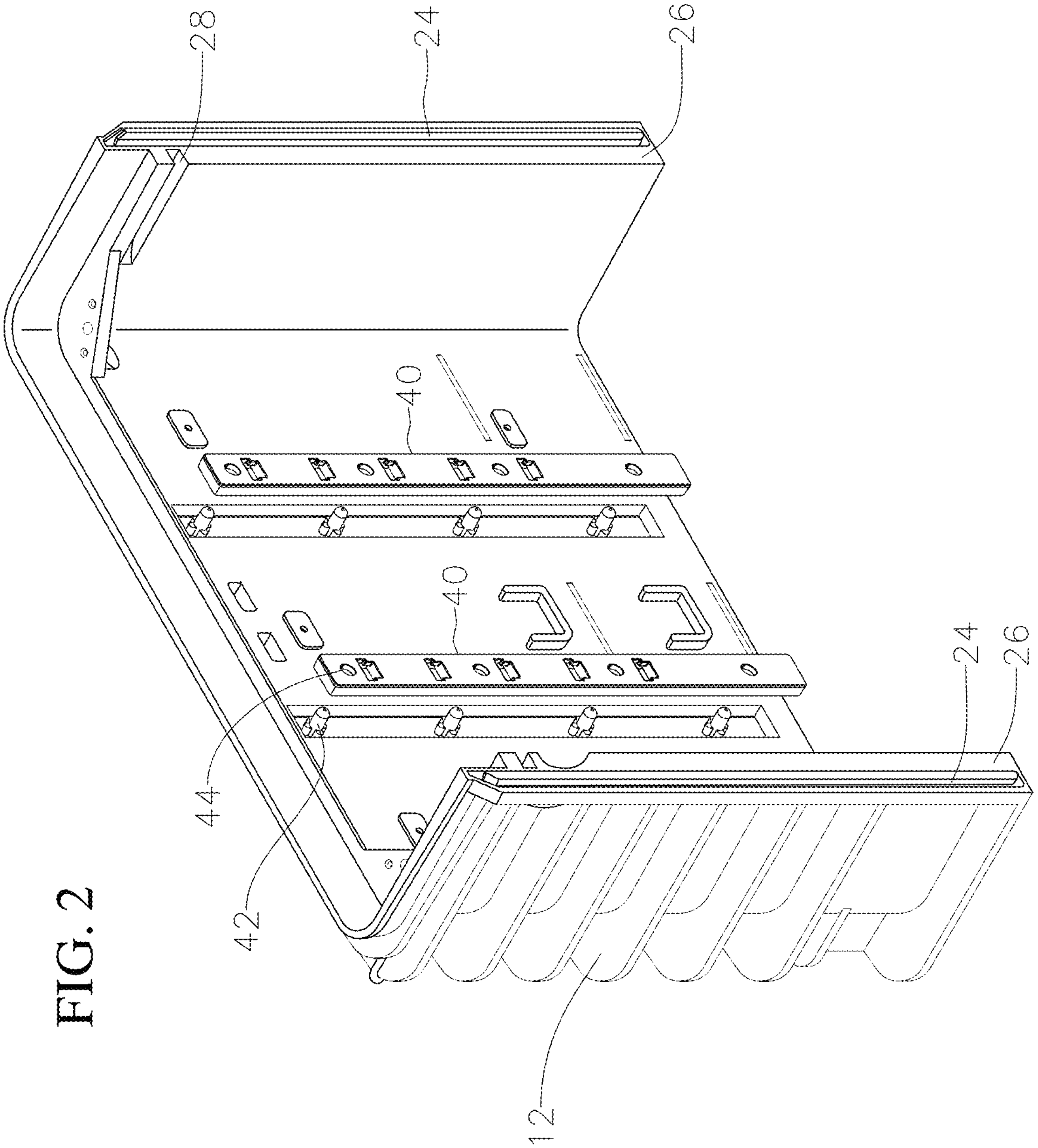
FIG. 2 is a perspective view one half of the enclosure of FIG. 1.

As also shown in FIG. 2, each half (only half 12 is shown), of the two halves of the vault to be joined are molded with a sacrificial pad 24 along each edge wall 26 that when heated will melt and fuse together with a sacrificial pad on the opposite vault half 14. The sacrificial pads 24 are designed with adequate size to create a continuous or non-continuous bond along a seam formed along end walls 18 to maintain the halves together and seal the interior 20 of the vault. The area to be welded includes channels and ribs 28 to minimize welded material from extruding past the perimeter of the vault as to be discussed in more detail herein.

Figure 3:
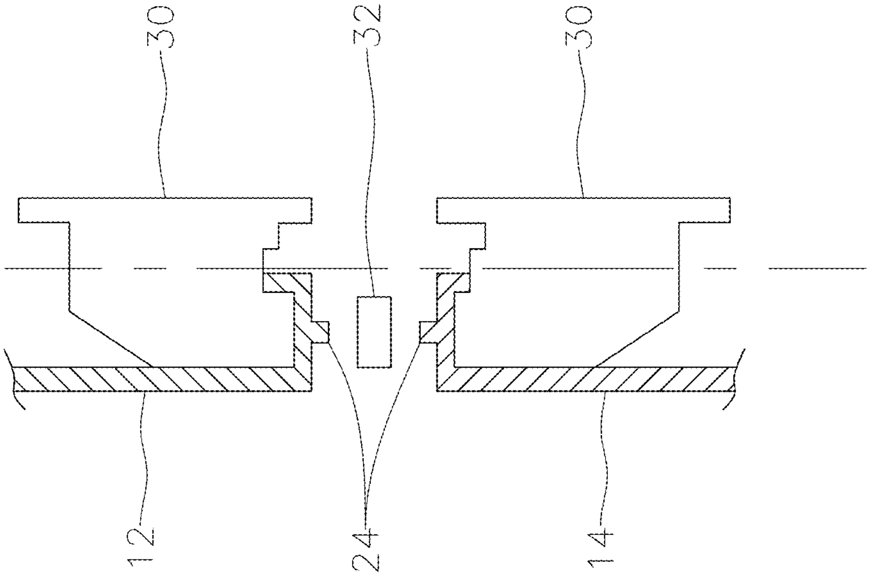
FIG. 3 is a schematic detail view of the enclosure halves within a fixture.
Figure 4:
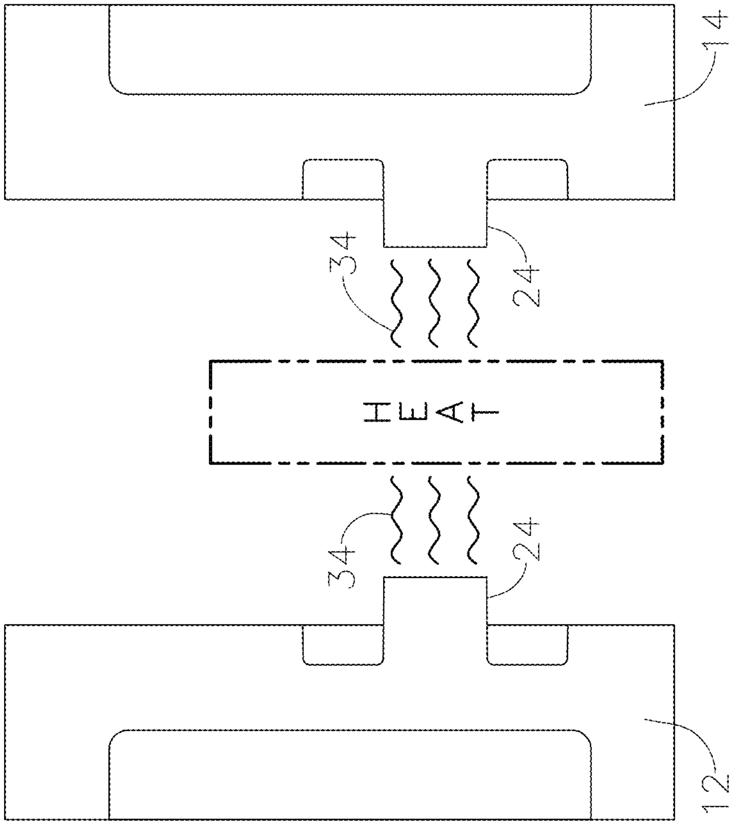
FIG. 4 is a schematic view of the heat plate.
Figure 5:
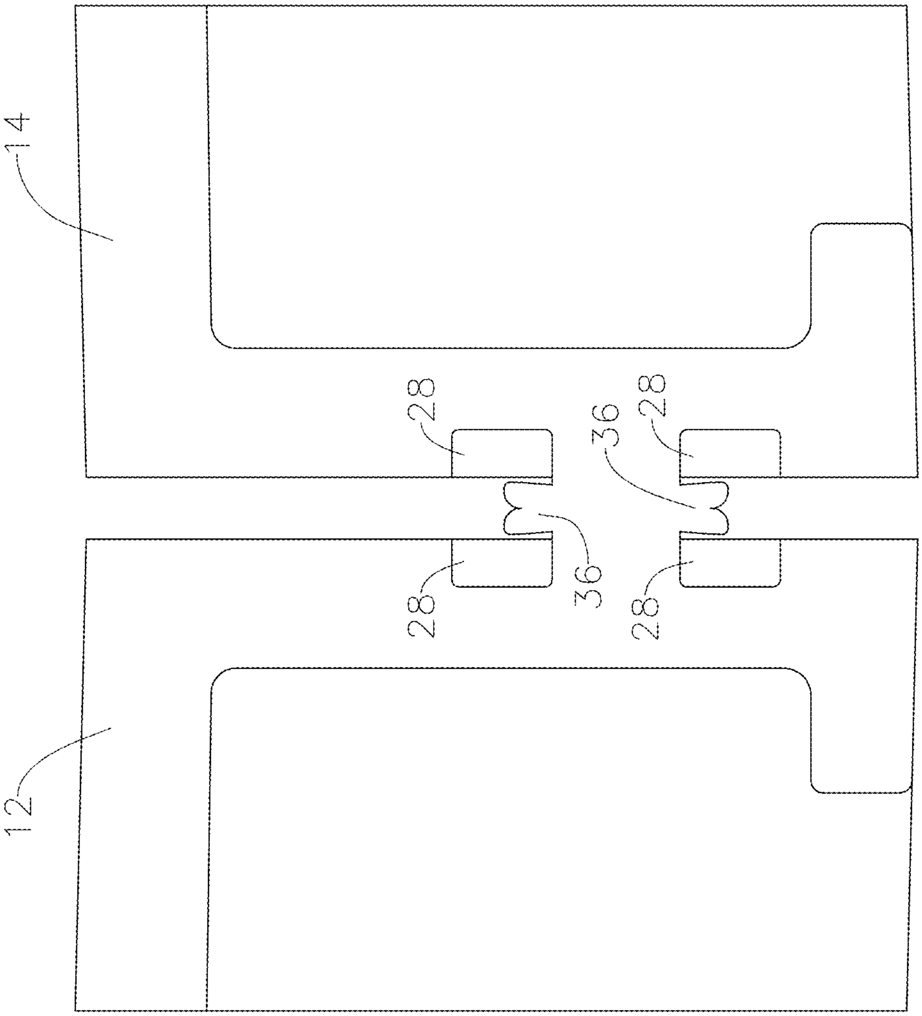
FIG. 5 is a schematic view of the welding process the present invention.
Figure 6:
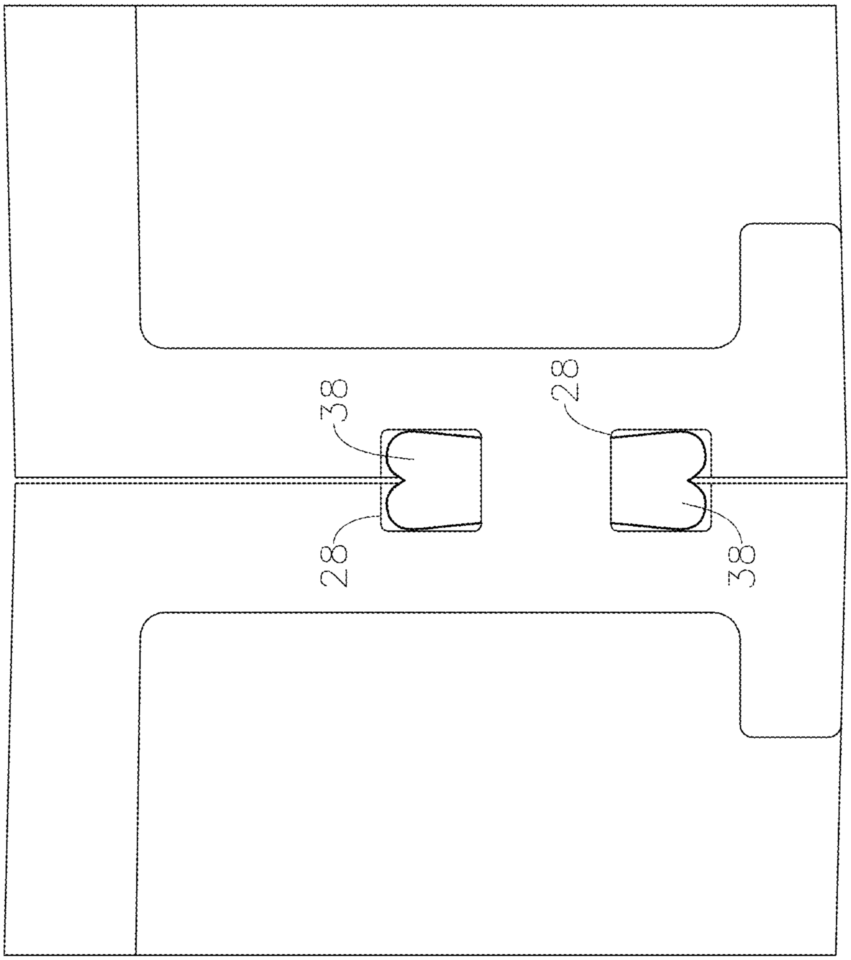
FIG. 6 is a schematic view of the welded enclosure.

As shown in FIG. 3, the vault halves 12, 14 are placed in a welding machine (FIG. 7) and each half is held in place by a fixture 30 where heat from a hot plate 32 is applied to the sacrificial pads 24 at a prescribed temperature for a specific time. The hot plate is then removed and the two surfaces to be joined are forced together under a predetermined pressure for a specified time to complete the joint. As shown in FIG. 4, heat 34 from plate 32 is transferred to pads 24 for each vault half 12, 14, then as shown in FIG. 5 the hot plate is removed and the halves are brought together welding the pads together at 36. As shown in FIG. 6, the excess material 38 from the pads welding together flows into channels 28. The welded halves have a connection strength that exceeds mechanical fasteners. Referring again to FIG. 2, racks 40 or other vault accessories, which prior to the invention were bolted into the side walls of the vault or enclosure, are welded in place. The vault halves are molded with a corresponding molded bosses or posts 42 to match with holes 44 in the rack or accessory. The bosses or posts protrude through the rack or accessory to the vault or enclosure and the end of the post is upset 46 by an ultrasonic welder to lock the rack or accessory in place as shown in FIG. 1.

Alternatively, heat from the hot plate is applied to the end of the boss or post to upset 46 the material and lock the rack or accessory in place. This is done with a prescribed temperature and pressure to form the required material upset.

Figure 7:
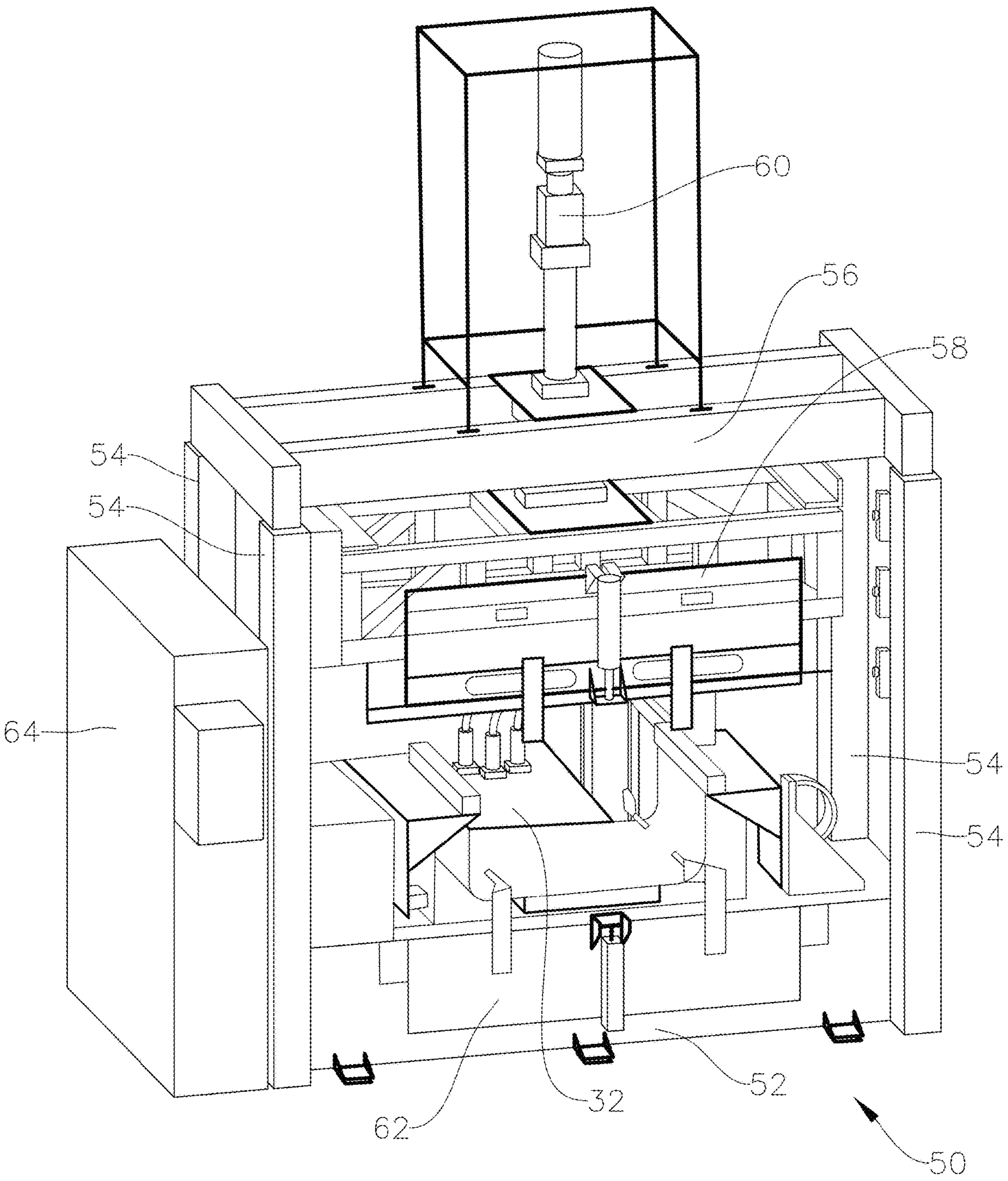
FIG. 7 is perspective view of the vault welding machine.

Referring to FIG. 7, the welding machine 50 is shown. The welding machine is a press 50 including a base 52 having a press column 54 extending upwardly from each corner of the base and a crown 56 positioned above the columns 54. A press slide carriage 58 is positioned below the crown and is attached to a pneumatic ram 60 positioned above the crown. Of the fixtures 30, one is attached to the slide carriage to be operated upwardly and downwardly by the ram 60. A clamping assembly 62 is positioned on the base 52 for attachment of the other fixture 30. The hot plate is actuatable into and out of the press between the fixtures.

The process of joining the vault halves together includes loading the halves onto a respective fixture in the press and moving the hot plate between the halves to heat the sacrificial pads. Once heated to the proper temperature to melt the pads, the hot plate is withdrawn, and the ram moves the press slide carriage and therefore the top fixture toward the bottom fixture to force the pads together under pressure for a period of time to complete the weld. Once cooled and the weld is complete the welded vault can be removed from the fixtures and the ram can be withdrawn. A panel 64 is located along one side of the press which houses the controls for operation of the press.

An example of the welding parameters for a vault such as illustrated in FIG. 1 include a welding temperature of 240° C.; a matching time of 14 seconds; a matching distance of approximately 2.5 mm; a heating time of 13 seconds; a fusion time of 14 seconds; and pressure created by a matching force between 0.2 N/mm^2 to 0.5 N/mm^2 which can be used to calculate the forces based on the weld pad surface area of each variant.

A sequence for sonic welding the posts would include the vault entering the station with the racks installed in the vault, seating the racks flat into slots in the sidewall of the vault. A sonic head lowers and turns on trigger power at 20 watts with a 20% amplitude and senses the post and the weld to a depth of 5.9 mm before turning off and the holding for three seconds of cool down before retracting and moving to the next post. When all post are welded, the vault lowers and exits the station.

Although the present invention has been described and illustrated herein with respect to an embodiment and method, however it is to be understood that changes and modifications can be made therein which are within the full intended scope of the invention as hereinafter claimed. For example, ultrasonic welding, vibration welding or robotically controlled plastic welding could be used to weld the seams.

What is claimed is:

1. A method of assembling a grade level vault formed in two halves comprising a first half and a second half, wherein each of the first half and the second half have an edge wall on opposite spaced apart end walls, each edge wall having a sacrificial pad extending outwardly therefrom comprising the steps of:

loading the first half onto a first fixture and the second half onto a second fixture in a press and moving a hot plate between the first half and the second half to heat the sacrificial pads to a predetermined temperature of 240° C.;

withdrawing the hot plate from between the first half and the second half; and moving the top fixture and the bottom fixture towards one another to force the pads together under a predetermined pressure based upon a matching force between 0.2 N/mm^2 to 0.5 N/mm^2 for a matching time of 14 seconds, a heating time of 13 seconds, and a fusion time of 14 seconds to weld the halves together and form a seam therebetween.

2. The method of claim 1, wherein the end walls of the first half and the second half have channels for receipt of welded material from the sacrificial pad.

3. The method of claim 1, further comprising positioning at least one rack on a side wall within the interior region.

4. The method of claim 3, further comprising forming posts extending inwardly from an inside surface of the side wall of the enclosure for receipt of the rack.

5. The method of claim 4, further comprising upsetting an end of the posts to lock the rack in place on the side wall.

6. The method of claim 5, wherein upsetting an end of the post is by sonic welding.

7. The enclosure of claim 1, wherein the first half and the second half are welded together under a matching distance of approximately 2.5 mm.

* * * * *